United States Patent [19]

Chmiel et al.

[11] Patent Number: 4,851,462

[45] Date of Patent: Jul. 25, 1989

[54] ADHESIVE FOR BONDING CURED EPDM RUBBER CONTAINING A CROSSLINKED HALOGENATED BUTYL RUBBER

[75] Inventors: Chester T. Chmiel, Granger; David A. Young, Elkhart, both of Ind.

[73] Assignee: Uniroyal Plastics Company, Inc., Mishawaka, Ind.

[21] Appl. No.: 146,468

[22] Filed: Jan. 21, 1988

[51] Int. Cl.$^4$ .......................... C08K 3/04; C08K 5/01; C08L 53/00

[52] U.S. Cl. .................................. 524/290; 524/196; 524/270; 524/274; 524/287; 524/288; 524/291; 524/323; 524/330; 524/345; 524/349; 524/369; 524/432; 524/450; 524/474; 524/496; 524/499; 524/507; 524/519; 525/232

[58] Field of Search ............... 524/432, 450, 474, 507, 524/323, 343, 345, 496, 290, 291, 499, 519, 270, 274, 287, 288, 330, 349, 369; 525/232

[56] References Cited

U.S. PATENT DOCUMENTS

| Re. 32,634 | 3/1988 | Chmiel et al. | 524/450 |
| 4,501,842 | 2/1985 | Chmiel et al. | 524/450 |
| 4,603,164 | 7/1986 | Chmiel et al. | 524/450 |

*Primary Examiner*—Herbert J. Lilling
*Attorney, Agent, or Firm*—Pennie & Edmonds

[57] ABSTRACT

A solvent based contact adhesive suitable for bonding cured EPDM membranes is disclosed. The adhesive includes a crosslinked halogenated butyl rubber, a low molecular weight, high softening point, thermoplastic aliphatic-type-based hydrocarbon resin and at least one organic solvent employed as a dispersion medium for the crosslinked halogenated butyl rubber and the resin. The disclosed adhesive exhibits superior heat aging and hot water immersion properties which are significant characteristics in roof applications.

23 Claims, No Drawings

ADHESIVE FOR BONDING CURED EPDM RUBBER CONTAINING A CROSSLINKED HALOGENATED BUTYL RUBBER

BACKGROUND OF THE INVENTION

1. Field of The Invention

This invention relates generally to adhesives and, more particularly, to a solvent based contact adhesive that is appropriate for bonding one or more sheets of cured ethylene-propylene-diene terpolymer (EPDM) membranes.

2. Description of the Prior Art

EPDM is widely employed in the tire manufacturing industry. In addition, EPDM membranes, particularly single-ply membranes, are often used as roofing materials. When employed in this capacity, it is oftentimes necessary to bond an EPDM membrane to itself in order to create a lap seam. A variety of adhesives have been developed for bonding, among other things, EPDM membranes.

For instance, neoprene-based splice adhesives were developed and used in the late 1970's. Specifically, Skeist, I., Handbook of Adhesives, pp. 880, New York, Reinhold Publishing Corp., (1977), discusses a neoprene-based adhesive being used to bond EPDM rubber.

Another known neoprene-based adhesive consists of neoprene dissolved in a mixture of solvents and incorporating resins, fillers, curatives and stabilizers to a total solid content of about 23%. This compound develops a T-peel adhesion of approximately 2 lbs./inch width.

Neoprene-based adhesives generally possess an excellent resistance to creep and cold flow, however, they exhibit relatively low levels of bond strength to cured EPDM.

Known contact adhesives based on butyl or polyisobutylene polymers, while developing good ultimate bond strength to cured EPDM, exhibit creep, cold flow and heat strength characteristics which are unsatisfactory. It has additionally been discovered that mixtures of neoprenes and butyls and/or polyisobutylenes do not adequately overcome those shortcomings discussed hereinabove.

EPDM itself is a poor adhesive polymer. When EPDM is employed as an adhesive, the resulting compounds have little or no tack and, when uncured, are very thermoplastic.

Accordingly, there is a need in the art for an adhesive which would develop a good ultimate bond strength to the joining of cured EPDM membranes, as well as maintaining satisfactory creep, cold flow and heat strength characteristics, all without the need for special surface preparations or for the use of high pressure and/or heat.

One solution to this need is disclosed in U.S. Pat. No. 4,501,842, which describes an adhesive formulation of a blend of three rubbers—namely, (1) a halogenated butyl rubber; (2) a pre-crosslinked butyl rubber; and (3) a three-block copolymer with polystyrene end blocks and a rubbery poly(ethylene-butylene) mid block, together with a petroleum hydrocarbon based aliphatic thermoplastic resin having a high softening point—along with a curing agent of an aliphatic isocyanate.

Isocyanates are suspected carcinogens and, consequently, an adhesive that is devoid of any isocyanates or related compounds would be an advantageous contribution to the art. Furthermore, the adhesive described in U.S. Pat. No. 4,501,842 must undergo a rigorous and cost-ineffective manufacturing procedure of mixing or milling in order to homogenize the three specific rubbers which comprise the adhesive.

Similarly, U.S. Pat. No. 4,603,164 describes an adhesive for bonding cured EPDM membranes. The adhesive of this patent includes (a) a halogenated butyl rubber; (b) a pre-crosslinked butyl rubber; (c) an ethylene-propylene-nonconjugated diene terpolymer; (d) a thermoplastic petroleum based hydrocarbon feedstock derived aliphatic monomer resin; and (e) an aliphatic isocyanate. Again, a need exists for non-isocyanate containing adhesives.

It is therefore an object of the present invention to provide an adhesive that will develop a good ultimate bond strength to the joining of cured EPDM membranes, while maintaining satisfactory creep, cold flow and heat strength characteristics.

It is a further object of the present invention to provide such an adhesive which is devoid of isocyanates or related compounds.

It is another object of the present invention to provide such an adhesive which can be prepared by employing relatively facile and cost-effective manufacturing procedures.

It is still another object of the present invention to provide such an adhesive which can be used for the preparation of a cured EPDM lap seam.

SUMMARY OF THE INVENTION

In accordance with a broad aspect of the present invention, an adhesive composition for bonding cured EPDM is provided which comprises (a) a crosslinked halogenated butyl rubber in an amount sufficient to provide adhesive properties to the composition; (b) a high softening point thermoplastic resin in an amount sufficient to impart improved heat aging and hot water immersion properties to the composition; and (c) at least one organic solvent in an amount sufficient to act as a dispersion medium for the crosslinked halogenated butyl rubber and the high softening point thermoplastic resin.

The present invention also provides a method for increasing the heat aging and hot water immersion properties of a crosslinked halogenated butyl rubber based adhesive composition. The method comprises adding to the composition, a high softening point thermoplastic resin in an amount sufficient to impart improved heat aging and hot water immersion properties thereto, along with at least one organic solvent in an amount sufficient to act as a dispersion medium for the butyl rubber and the thermoplastic resin.

The superior heat aging and hot water immersion properties are significant characteristics in the art of roofing and of fabricating roofing materials. In addition, since the present adhesive, in its preferred form, is devoid of isocyanate or related compounds, a significant contribution has been made to the art. Furthermore, the present adhesive possesses an excellent ultimate bond strength to the joining of cured EPDM membranes while maintaining desirable creep, cold flow and heat strength characteristics. Still another advantage of the present adhesive is associated with its relatively facile and cost-effective method of manufacture.

DESCRIPTION OF THE PREFERRED EMBODIMENTS

The crosslinked halogenated butyl rubber component of the present invention imparts improved heat and hot water immersion weather aging bond strength properties to the final adhesive formulation.

The crosslinked halogenated butyl rubber component preferably has a Mooney viscosity of about 50 to about 50 (ML 1+8 at 125° C.) at a concentration of 100% parts per 100 rubber (PPHR). A preferred crosslinked halogenated butyl rubber contemplated herein is schematically represented as follows:

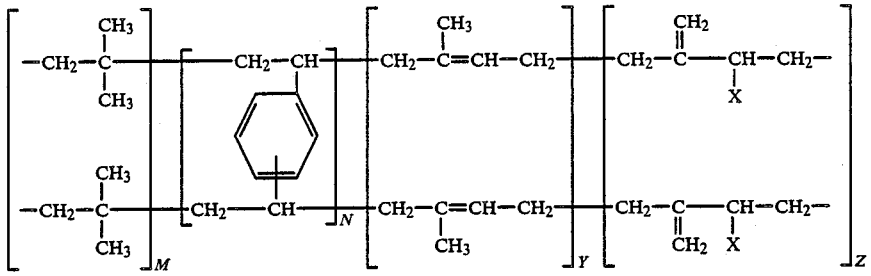

where X is Cl or Br, and M=96, N=2, Y=1 and Z=1.

The crosslinked halogenated butyl rubber depicted above is identified as XL-40302, is available from Polysar Limited, Sarnia, Ontario, Canada, and is manufactured by a process which is proprietary to Polysar Limited.

The molecular structure of regular butyl rubber is schematically illustrated, as represented by Skeist, I., Handbook of Adhesives, pp. 225, New York, Reinhold Publishing Corp., (1977), as follows:

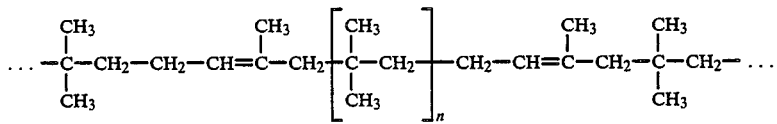

where n is about 50.

Halogenation of the butyl rubber polymer illustrated above can be performed in any known manner, however, is preferably derived through a proprietary process with up to 90% of the halogenation situated allylic to the double bond with retention of most of the unsaturation.

The resin component of the present invention is a low molecular weight, high softening point, thermoplastic aliphatic-type-based hydrocarbon resin which can be made from petroleum monomers. The aliphatic-type resin is employed for the purpose of improving the high temperature heat strength of the butyl rubber component.

The aliphatic-type resin is derived from hydrocarbon feedstock monomers possessing from about 5 to about 9 carbon atoms, which are polymerized to varying molecular weight ranges so as to achieve softening points of about 150° C. to about 200° C. and, preferably, from about 160°C. to about 185° C. The higher softening resins, when incorporated into the present adhesive formulation, impart higher strengths to the butyl rubber component at a test temperature of about 70+ C. High softening point thermoplastic resins from the Piccovar™ series produced by Hercules, Inc., Wilmington, Del., with a softening point of about 175° C. to about 181° C., an acid number of less than about 1 and a bromine number of about 16 to about 20 at a concentration of 80 to 120 parts per 100 rubber (PPHR), are illustrative of the low molecular weight, high softening point, thermoplastic, aliphatic-type-based hydrocarbon resin contemplated herein.

Optionally, where high temperature performance is required, zinc oxide can be added to the present adhesive formulation to allow some modulus increase of the crosslinked halogenated butyl rubber component; however, only to a limited degree so that the stability of the solution does not become adversely affected.

The zinc oxide can be added at a concentration of about 0.5 to about 3 PPHR and, preferably, at a concentration of about 0.5 to about 2 PPHR. A typical zinc oxide is Protox 166 produced by New Jersey Zinc Co.

A hindered phenolic antioxidant can be employed at a concentration of about 0.5 to about 3 PPHR for the purpose of reducing the oxidation of the crosslinked halogenated butyl rubber polymer. Useful antioxidants include, but should not be limited to butylated hydroxy toluene; 4,4'-butylidene-bis-(6-t-butyl-m-cresol); 2,2,-methylene-bis-(4-methyl-6-t-butyl phenol); styrenated phenol; thiodiethylene bis (3,5-di-t-butyl-4-hydroxy) hydro cinnamate; 4,4'-butylidene-bis-(6-tert-butyl meta-cresol); and octadecyl 3,5-di-tert-butyl-4 hydroxyhydro cinnamate. A preferred type is tetrakis methylene (3,5-di-tert-butyl-4-hydroxyhydro cinnamate) methane available as Irganox 1010 from Ciba-Giegy. This material may be schematically represented as:

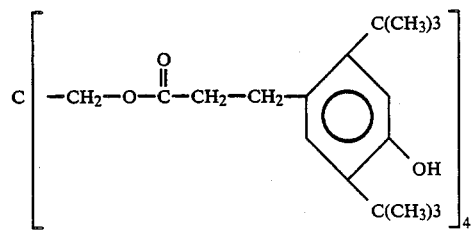

Carbon black can optionally be added for pigmenting purposes and/or to add reinforcement to the final adhesive formulation. The carbon black may be of medium reinforcement character, having an ASTM number from N-285 through N-330, and can be employed at a concentration of about 2 to about 20 PPHR.

If so desired, for instance, in situations where its presence does not present a problem isocyanate may be added to the present adhesive formulation to impart even greater adhesion properties. However, it is to be understood that the adhesive formulation of the present invention exhibits superior adhesive properties without the inclusion of isocyanate or isocyanate related compounds.

Notwithstanding, organic isocyanates contemplated herein include, 1,6-hexamethylene diisocyanate; 2,4- and 2,6-toluene diisocyanate; 4,4-diphenylmethane diisocyanate; polymethylene polyphenylisocyanate; 4,4-dicyclohexylmethane diisocyanate; and xylylene diisocyanate. However, it has been discovered that most of these isocyanates tend to give either short gel times or reduced high temperature heat strength. A more preferred isocyanate is Desmodur ™ N-75 isocyanate, which is available in a 75% solution from Mobay Chemical Corporation, Pittsburgh, Pa. This specific material has an NCO content of 15 to 17% and is an aliphatic compound which is an adduct based on 1,6-hexamethylene diisocyanate:

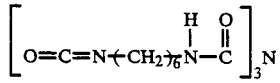

This specific isocyanate can be employed at concentrations in the range of 20-35 PPHR.

The aforementioned components, including those which can optionally be employed, are dispersed in an organic solvent or solvent blend having a solubility parameter of about 8.5 to about 8.9 and a hydrogen bonding index of 3 to 3.5 at a concentration of 455 to 610 PPHR, thereby giving a total solids level of about 26 to about 32. To improve ease of application and drying of the adhesive formulation, the dispersing medium may be a blend of two or more solvents.

The nature of the solvent blend described hereinabove provides good solubility of the butyl rubber polymer and imparts a fast drying character, but retains some solvent, giving good tack for bonding.

During manufacture and packaging, a certain degree of moisture may be inadvertently be incorporated into the present adhesive formulation. Thus, to remove this moisture, an aluminosilicate zeolite adsorbent can be added to the formulation. This family of compounds are commonly referred to as molecular sieves. Typical molecular sieves are 5A or 13X available from Union Carbide Corp. (Linde Division), New York, N.Y. These molecular sieves are employed at a concentration level of about 5.0 to about 15.0 PPHR.

The following examples are provided to further illustrate the present invention and are not intended to limit the invention in any way.

EXAMPLE 1

Cured EPDM membrane test strips having dimensions of 4"×12" and a thickness of 0.065" were prepared by vigorously washing the surface with a cheesecloth soaked with hexane. Masking tape was used to mask 1" from the top and 1" from the bottom of the membrane, thereby exposing a 4"×10" EPDM surface. A thin coat of about 0.005" of the butyl adhesive described in U.S. Pat. No. 4,603,164 was brushed onto the exposed membrane in a normal paint stroke fashion and was then permitted to dry for 2 hours. After drying, the membrane strip was folded upon itself, in an adhesive-to-adhesive manner, and the folded end was cut off. A 1 lb. handroller was rolled over the folded membrane in the longitudinal and lateral directions to ensure good contact between the adhesive surface, with no bubbling occurring. Two 1"×6" sample strips were cut from the resulting 4"×6" membrane strips. To prepare samples for shear testing, EPDM strips covered with adhesive and dried for 2 hours at room temperature were overlapped at a contact area of 1"×1" and laminated with a hand roller. The adhesion sample was permitted to age 7 days at 25° C. The sample was tested for adhesion on an ISTRON ® tensile tester with a jaw speed set for 2"/min. Testing was performed at 25° C. and 70° C. The test results appear below in Table I.

TABLE I

| Test at 2"/Min. | 25° C. | 70° C. |
| --- | --- | --- |
| T-Peel Adhesion (lb./in. width) | 6.4 | 0.3 |
| Lap Shear Adhesion (lb./in.$^2$) | 22.2 | 5.4 |

These data demonstrate the adhesion level generated by a known butyl based adhesive aged at room temperature for 7 days.

EXAMPLE 2

Cured EPDM membrane test strips were prepared and aged in accordance with Example 1.

The amount of each of the components employed in the adhesive formulation of the example is based upon 100 parts of the rubber component (Polysar XL-40302).

Polysar XL-40302 (100 parts) was mixed with 10 parts of Cabot Carbon Black Regal 300 in a Banbury mixer or on a mill to produce a carbon black-rubber master. The solubilization of the carbon black-rubber master was initiated by adding a solvent blend into the mixing vessel. The solvent blend consisted of 387 parts toluene, 43 parts hexane and 107 parts xylene. 100 parts of Hercules Piccovar AB-180, 2 parts of zinc oxide and 2 parts of Ciba-Geigy Irganox 1010 were added to the mixer. The components added were mixed for 8 hours and, thereafter, the resulting admixture was cooled.

The resulting adhesive formulation was applied to the EPDM membrane test strips in the manner discussed in Example 1 and, in addition, the membrane was tested in the manner of Example 1. The test results appear below in Table II.

TABLE II

| Test at 2"/Min. | 25° C. Results | 70° C. Results |
| --- | --- | --- |
| T-Peel Adhesion (lb./in. width) | 6.6 | 0.6 |
| Lap Shear Adhesion (lb./in.$^2$) | 22.2 | 6.0 |

As these data demonstrate, the adhesive formulation of the present invention exhibits T-peel adhesion and lap shear adhesion properties which are similar to those exhibited by the known adhesive which includes isocyanate.

EXAMPLE 3

Cured EPDM membrane test strips were prepared and aged in the manner of Example 1. The procedure for preparing the adhesive formulation of Example 2 was followed herein, however, isocyanate was added to the adhesive mixing vessel and included in the adhesive formulation of this Example. The resulting adhesive formulation was applied to the EPDM membrane test strips and the membrane was tested in the manner of Examples 1 and 2. The test results appear below in Table III.

TABLE III

| Test at 2"/Min. | 25° C. Results | 70° C. Results |
|---|---|---|
| T-Peel Adhesion (lb./in. width) | 6.8 | 0.8 |
| Lap Shear Adhesion (lb./in.$^2$) | 26.4 | 6.8 |

These data demonstrate the adhesive properties of the present adhesive formulation with the addition of isocyanate.

EXAMPLE 4

The use of adhesive and procedure for preparing the sample strips of Example 1 were repeated here. However, the sample strips of this Example were aged for 2 days at room temperature, 7 days at 70° C., and 1 day at room temperature before being tested at 25° C. and 70° C. The test results appear below in Table IV.

TABLE IV

| Test at 2"/Min. | 25° C. Results | 70° C. Results |
|---|---|---|
| T-Peel Adhesion (lb./in. width) | 6.1 | 1.0 |
| Lap Shear Adhesion (lb./in.$^2$) | 22.9 | 6.7 |

EXAMPLE 5

The use of adhesive and procedure for preparing the sample strips of Example 2 were repeated here. The resulting sample strip was aged and tested in the manner of Example 4. The test results appear below in Table V.

TABLE V

| Test at 2"/Min. | 25° C. Results | 70° C. Results |
|---|---|---|
| T-Peel Adhesion (lb./in. width) | 6.0 | 2.5 |
| Lap Shear Adhesion (lb./in.$^2$) | 35.7 | 11.7 |

EXAMPLE 6

The use of adhesive and procedure for preparing the sample strip of Example 3 were repeated here. The resulting sample strip was aged and tested in the manner of Examples 4 and 5. The test results appear below in Table VI.

TABLE VI

| Test at 2"/Min. | 25° C. Results | 70° C. Results |
|---|---|---|
| T-Peel Adhesion (lb./in. width) | 5.8 | 2.7 |
| Lap Shear Adhesion (lb./in.$^2$) | 30.2 | 11.9 |

Examples 5 and 6, when compared with Example 4, demonstrate the superior heat aging properties of the present adhesive formulation, both with (Example 6) and without (Example 5) isocyanate included in the adhesive formulation.

EXAMPLE 7

The use of adhesive and procedure for preparing the sample strips of Example 1 were repeated here. However, the sample strips of this Example were aged in water at 70° C. for 30 days before being tested for T-peel adhesion at 25° C. and 70° C. The test results appear below in Table VII.

TABLE VII

| Test at 2"/Min. | 25° C. Results | 70° C. Results |
|---|---|---|
| T-Peel Adhesion (lb./in. width) | 7.0 | 1.4 |

EXAMPLE 8

The use of adhesive and procedure for preparing the sample strips of Example 2 were repeated here. The resulting sample strip was aged and tested in the manner of Example 7. The test results appear below in Table VIII.

TABLE VIII

| Test at 2"/Min. | 25° C. Results | 70° C. Results |
|---|---|---|
| T-Peel Adhesion (lb./in. width) | 6.2 | 2.0 |

EXAMPLE 9

The use of adhesive and procedure for preparing the sample strip of Example 3 were repeated here. The resulting sample strip was aged and tested in the manner of Examples 7 and 8. The test results appear below in Table IX.

TABLE IX

| Test at 2"/Min. | 25° C. Results | 70° C. Results |
|---|---|---|
| T-Peel Adhesion (lb./in. width) | 7.10 | 3.20 |

Examples 8 and 9, when compared to Example 7, demonstrate the superior hot water immersion properties of the present adhesive formulation, both with (Example 9) and without (Example 8) isocyanate included in the adhesive formulation, particularly when comparing test data obtained at 70° C.

What is claimed is:

1. An adhesive composition for bonding cured EPDM comprising:
    (a) a crosslinked halogenated butyl rubber in an amount sufficient to provide adhesive properties to the composition;
    (b) a high softening point thermoplastic resin in an amount sufficient to impart improved heat aging and hot water immersion properties to the composition; and
    (c) at least one organic solvent in an amount sufficient to act as a dispersion medium for said crosslinked halogenated butyl rubber and said high softening point thermoplastic resin.

2. The adhesive of claim 1 wherein said crosslinked halogenated butyl rubber has a Mooney viscosity of about 50 to about 60 (ML 1+8 at 125° C.) at a concentration of 100% PPHR.

3. The adhesive of claim 1 wherein said crosslinked halogenated butyl rubber includes crosslinked bromobutyl rubber and crosslinked chlorobutyl rubber.

4. The adhesive of claim 1 wherein said high softening point thermoplastic resin is a low molecular weight aliphatic-type-based hydrocarbon resin.

5. The adhesive of claim 4 wherein said low molecular weight, high softening point, thermoplastic aliphatic-type-based hydrocarbon resin is fabricated from petroleum monomers.

6. The adhesive of claim 5 wherein said petroleum monomers have from about 5 to about 9 carbon atoms.

7. The adhesive of claim 1 wherein said high softening point thermoplastic resin has a softening point of about 150° C. to about 200° C.

8. The adhesive of claim 1 wherein said high softening point thermoplastic resin has a softening point of about 160° C. to about 185° C., an acid number of less than about 1 and a bromine number of about 16 to about 20.

9. The adhesive of claim 1 which further comprises zinc oxide in an amount sufficient to permit a certain degree of modulus increase of said crosslinked halogenated butyl rubber so that said composition may be utilized at higher temperatures.

10. The adhesive of claim 9 wherein said zinc oxide is employed at a concentration level of about 0.5 to about 3 PPHR.

11. The adhesive of claim 1 which further comprises an antioxidant in an amount sufficient to reduce the oxidation of the crosslinked halogenated butyl rubber.

12. The adhesive of claim 11 wherein said antioxidant is a hindered phenolic antioxidant employed at a concentration level of about 0.5 to about 3 PPHR.

13. The adhesive of claim 12 wherein said hindered phenolic antioxidant is selected from the group consisting of butylated hydroxy toluene; 4,4'-butylidenebis-(6-t-butyl-m-cresol); 2,2,-methylene-bis-(4-methyl-6t-butyl phenol);styrenated phenol; thiodiethylene bis (3,5-di-t-butyl-4-hydroxy) hydro cinnamate; 4,4'-butylidene-bis-(6-tert-butyl metacresol); octadecyl 3,5-di-tert-butyl-4 hydroxyhydro cinnamate; and tetrakis methylene (3,5-di-tert-butyl-4-hydroxyhydro cinnamate) methane.

14. The adhesive of claim 1 which further comprises carbon black.

15. The adhesive of claim 14 wherein said carbon black is employed at a concentration level of about 2 to about 20 PPHR.

16. The adhesive of claim 1 which further comprises an isocyanate compound in an amount sufficient to increase the adhesive properties of the composition.

17. The adhesive of claim 16 wherein the isocyanate compound is 1,6-hexamethylene diisocyanate; 2,4-and 2,6-toluene diisocyanate; 4,4-diphenylmethane diisocyanate; polymethylene polyphenylisocyanate; 4,4-dicyclohexylmethane diisocyanate; and xylylene diisocyanate.

18. The adhesive of claim 1 wherein said organic solvent dispersion medium has a solubility parameter of about 8.5 to about 8.9, a hydrogen bonding index of 3 to 3.5 at a concentration of 455 to 610 PPHR resulting in a total solid level of about 26 to about 32.

19. The adhesive of claim 1 which further comprises an aluminosilicate zeolite adsorbent employed at a concentration level of about 5 to about 15 PPHR.

20. An adhesive composition for bonding cured EPDM comprising:
(a) a crosslinked halogenated butyl rubber selected from the group consisting of crosslinked bromobutyl rubber and crosslinked chlorobutyl rubber in an amount sufficient to provide adhesive properties to the composition;
(b) a low molecular weight, high softening point thermoplastic aliphatic-type-based hydrocarbon resin, said resin being fabricated from about 5 to about 9 carbon atoms, which are polymerized to varying molecular weight ranges to achieve softening points of about 160° C. to about 185° C. in an amount sufficient to impart improved heat aging and hot water immersion properties to the composition;
(c) zinc oxide employed at a concentration level of about 0.5 to about 3 PPHR;
(d) a hindered phenolic antioxidant employed at a concentration level of about 0.5 to about 3 PPHR;
(e) carbon black employed at a concentration level of about 2 to about 20 PPHR; and
(f) at least one organic solvent having a solubility parameter of about 8.5 to about 8.9, a hydrogen bonding index of 3 to 3.5 at a concentration of 455 to 610 PPHR resulting in a total solid level of about 26 to about 32.

21. A method for increasing the heat aging and hot water immersion properties of a crosslinked, halogenated butyl rubber based adhesive composition which comprises adding thereto a high softening point thermoplastic resin in an amount sufficient to impart improved heat aging and hot water immersion properties thereto, along with at least one organic solvent in an amount sufficient to act as a dispersion medium for the butyl rubber and thermoplastic resin.

22. The method of claim 21 which further comprises adding thereto an isocyanate compound in an amount sufficient to increase the adhesive properties of the composition.

23. The method of claim 22 which further comprises adding thereto zinc oxide in an amount sufficient to impart high temperature resistance to the composition.

* * * * *

UNITED STATES PATENT AND TRADEMARK OFFICE
CERTIFICATE OF CORRECTION

PATENT NO. : 4,851,462
DATED : July 25, 1989
INVENTOR(S) : Chester T. Chmiel, et al.

It is certified that error appears in the above-identified patent and that said Letters Patent is hereby corrected as shown below:

In the Specification, at column 3, line 10, change "50 (ML 1+8 at 125° C.)" to -- 60 (ML 1+8 at 125° C.) --.

In the Specification, at column 3, line 66, change "70+ C." to -- 70° C. --.

Signed and Sealed this

Third Day of April, 1990

Attest:

HARRY F. MANBECK, JR.

*Attesting Officer*  *Commissioner of Patents and Trademarks*